3,065,270
PREPARATION OF DIMETHYLNITROSOAMINE
John F. Haller, Niagara Falls, N.Y., assignor to Olin Mathieson Chemical Corporation, a corporation of Virginia
No Drawing. Filed Oct. 27, 1954, Ser. No. 465,133
17 Claims. (Cl. 260—583)

This invention relates to improvements in the manufacture of dialkylnitrosoamines and particularly dialkylnitrosoamines of low molecular weight. It relates still more particularly to improvements in the manufacture of dimethylnitrosoamine.

Dimethylnitrosoamine (N-nitrosodimethylamine) has previously been prepared, usually from an acidified solution of dimethylamine hydrochloride and sodium nitrite. The dimethylamine hydrochloride solution containing some additional hydrochloric acid is treated by adding a sodium nitrite solution slowly over a period of hours. In addition, dilute hydrochloric acid is added from time to time to maintain the reaction barely acid to litmus. If the acid reaction is not maintained, the reaction does not proceed and if the medium becomes too acid, nitrous gases are lost and low yields are obtained. Nitric oxide, oxygen and caustic are consumed in the manufacture of the sodium nitrite used in this process. Hydrochloric acid is consumed in the manufacture of the amine hydrochloride and additional hydrochloric acid is added. This process uses relatively expensive reagents and yields the product as a dilute aqueous solution from which it must be extracted. The process is not amenable to large scale production.

In contrast, the process of the present invention uses cheap starting materials, produces concentrated solutions of dimethylnitrosoamine, operates continuously with a minimum of labor and is thus particularly advantageous for commercial production. The novel process starting from nitric oxide avoids the manufacture of sodium nitrite. The caustic and acid necessary for the prior art process, using sodium nitrite, is avoided. These savings contribute materially to the economic advantage of the present process.

The process of the present invention for the manufacture of dialkylnitrosoamines comprises the reaction of nitric oxide, oxygen and a dialkylamine to produce a liquid product which contains a substantial proportion of the dialkylnitrosoamine as well as an amount of dialkyl ammonium nitrite, the relative proportions of dialkylnitrosoamine and dialkyl ammonium nitrite depending upon the reaction conditions employed. For many purposes, this impure liquid product can be used for any purposes for which dialkylnitrosoamines have heretofore been used, particularly where such use involves the application of heat and where the presence of water is not objectionable.

If desired, however, the liquid product of the reaction of nitric oxide, oxygen and dialkylamine can be subjected to a heat treatment at temperatures of about 120° to about 140° C. to effect decomposition of the dialkyl ammonium nitrite to the corresponding dialkylnitrosoamine according to the following reaction:

$$RR'NH.HNO_2 \rightarrow RR'N.NO + H_2O$$

wherein R and R' are alkyl radicals. This decomposition appears to be completed only at temperatures of at least about 120° C. Temperatures of above about 140° C. are to be avoided because the product appears to darken and decompose. Only a few minutes heating at about 120°–140° C. is necessary to complete the decomposition of the nitrite to the desired product. The heating operation can be carried out batchwise by heating the liquid dialkylnitrosoamine-dialkyl-ammonium nitrite mixture to the indicated temperature and cooling, or in a continuous process in which the dialkylnitrosoamine-nitrite mixture is passed through a heating coil or over a heated surface and cooled. Anhydrous dialkylnitrosoamine can be obtained from the heat treated product by fractional distillation or, on a small scale, by saturating the heated mixture with anhydrous potassium carbonate, caustic soda or caustic potash, followed by extraction with ether and distillation of the extract. Anhydrous dimethylnitrosoamine boils at 149–150° C. at atmospheric pressure.

In carrying out the reaction of the nitric oxide, oxygen and dialkylamine the reaction can be conducted in the liquid or in vapor phase. In the liquid phase reaction, the reaction can be carried out using an aqueous or non-aqueous solvent, especially the dialkylnitrosoamine as solvent. In the vapor phase reaction, anhydrous gases produce water of reaction and at the temperatures involved a liquid aqueous phase.

In carrying out the reaction of the nitric oxide, oxygen and dimethylamine, when dimethylnitrosoamine is desired as the product, the reactants are employed substantially in the molar proportions 4:1:4, respectively. Preferably, the gases are combined in suitable order so that the oxidation of the nitric oxide occurs in the presence of the dialkylamine. The dialkylamine can suitably be a flowing stream of gas to which air and nitric oxide are introduced in either order. Alternatively, the dialkylamine vapor can be admixed with either of the other two gaseous reactants, the third being added later.

It is an essential feature of this invention that the reaction of the nitric oxide and oxygen always occurs in the presence of an excess of dialkylamine and that the reaction medium is thus maintained in an alkaline condition in order to prevent the formation of nitric and nitrous acids. As the oxidation of the nitric oxide proceeds, nitrous anhydride reacts with the dialkylamine to form dialkylammonium nitrite and/or dialkylnitrosoamine converting in this way all of the nitric oxide to nitrite or nitroso compound. This is essential because under acid conditions the oxidation of nitric oxide produces only nitric acid and re-formed nitric oxide. The latter is eventually completely oxidized to nitric acid which forms the nitrate salt of dialkylamine and no nitrite salt or dialkylnitrosoamine. The reaction medium is easily maintained in an alkaline condition at all times by the introduction of at least a slight excess of dialkylamine. The necessity of accurate control of the pH of the reaction medium is avoided and the process is easily controlled on a commercial scale. The use of a greater excess is not objectionable except that economic considerations would require that any considerable excess of amine should be subsequently separated and recycled.

Atmospheric oxygen is a suitable source of the oxygen required, as it will ordinarily contain a sufficient proportion of moisture to cause the reaction to occur. Nitric oxide and air can be introduced approximately in the theoretical proportions to produce nitrous anhydride ($N_2O_3$), that is about four volumes of nitric oxide per volume of oxygen or four volumes of nitric oxide to five volumes of air. A particularly advantageous source of nitric oxide is the effluent gas from an ammonia oxidizer such as used in the manufacture of nitric acid. This gas is principally a mixture of nitric oxide, water and excess air formed according to the equation:

$$4NH_3 + 5O_2 \text{ (air)} \rightarrow 4NO + 6H_2O$$

The further oxidation of nitric oxide is slow and by cooling to condense the water, a gas stream can be separated which comprises principally nitric oxide and excess air. This gas is well suited for use according to the present invention and is readily available from any existing ammonia oxidation unit.

The synthesis reaction of the present invention is exothermic and suitable provision for cooling the reaction chamber and its contents should be provided. The apparatus can take the form of a packed reaction chamber which is cooled by means of a water jacket or suitable internal piping. Alternatively, the reaction product flowing from the bottom of the chamber can be cooled and recycled to provide adequate cooling.

In the reaction of the present invention using gaseous reactants, a liquid product is produced which usually separates as a fog of small droplets. Circulation of the liquid product through a packed reaction tower provides cooling and also removes the droplets of products as liquid. Other means can be used to recover the first reaction product. It is readily amenable to separation by means of a cyclone separator, filtration through a mat of glass fibers, by a Cottrell precipitator or other known means for the separation of such suspensions. It is an advantage of the gaseous reaction method that the product obtained is more concentrated than when the reaction is carried out in an aqueous medium.

The aqueous system reaction method is advantageous in that fog formation is avoided. In this form of the invention, aqueous solutions of dimethylamine, for example, up to a concentration of about 25% are readily available at atmospheric pressures and are suitable for use according to this invention. By operating the process at superatmospheric pressures, more concentrated aqueous solutions of dimethylamine (from 25 to 100%) can be used advantageously. Since dimethylamine is very soluble in dimethylnitrosoamine, the gaseous amine can be dissolved in a recycling stream of dimethylnitrosoamine or in the crude reaction product containing dimethylamine nitrite. Atmospheric or superatmospheric pressure can be used.

In a particularly advantageous modification of the present invention, a mixture of dialkylamine and trialkylamine can be used and converted substantially entirely to dialkyl nitrosoamine. This modification is particularly advantageous in that crude mixtures of alkylamines, obtained, for example, by the catalytic ammoniation of alcohols, can be used in my process without previously subjecting the mixture to extensive separation. Such a mixture contains, for example, dimethylamine, trimethylamine and a minor amount of monomethylamine. The proportion of dialkylamine to trialkylamine in the mixture used in my process can vary widely and this modification may be used when the recovery and conversion of the trialkylamine is economically justified.

In this modification of the invention the mixed amines react with nitrous anhydride or its equivalent in mixed nitrous gases as described above. Dialkylamine contained in the mixed gas reacts independently to form dialkyl ammonium nitrite and dialkylnitrosoamine. Trialkylamine contained in the mixed amine reacts to form trialkyl ammonium nitrite. The effluent liquor from the reactor is subjected to heat treatment as described above, simultaneously introducing further quantities of mixed dialkylamine and trialkylamine through the liquid. Dialkylnitrosoamine remains as such in the treated liquor, dialkyl ammonium nitrite decomposes as described to form additional quantities of dialkylnitrosoamine and water while trialkylammonium nitrite reacts with dialkylamine in the mixed gas to form additional quantities of dialkyl ammonium nitrite. At lower temperatures an equilibrium might be established according to the first equation of the following scheme; wherein R, R' and R" are alkyl radicals:

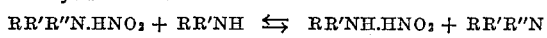

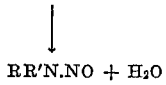

but at elevated temperatures of about 120 to 140° C., dialkyl ammonium nitrite decomposes rapidly and is thus removed. By unbalancing the equilibrium in this way, substantially all of the trialkyl ammonium nitrite is converted to trialkylamine and the exit gas comprises mixed amines substantially enriched in trialkylamine. This gas, admixed with additional quantities of ammonia and recycled to a conventional amine synthesis operation can be enriched in dialkylamine and returned to the process of the present invention. Eventually all the trialkylamine is converted to dialkylnitrosoamine without the necessity of previously separating dialkylamine from trialkylamine.

The following examples illustrate in detail various embodiments of the present invention but are not to be considered as limitative thereof.

Example I

During a reaction period of 75 minutes, a total of 0.54 gm. mole of dimethylamine, introduced as a 25% aqueous solution, 0.47 gm. mole of nitric oxide and 0.11 gm. mole of oxygen (as air) were introduced at room temperature into the top of a vertically arranged tubular reaction space packed with glass helices. The reaction product drained from the open bottom of the reactor. It was collected, heated to refluxing temperature (about 120° C.) and then cooled. An equal volume of 50% caustic was added. The supernatant oil comprising anhydrous dimethylnitrosoamine was separated and amounted to a yield of 66% based on the nitric oxide introduced.

Example II

Gaseous dimethylamine at room temperature was introduced at the rate of 500 ml. per minute into a pipe line. Subsequently into the line were introduced 400 ml. per minute of gaseous nitric oxide and 500 ml. per minute of air, both at room temperature. Liquid product accumulated at the rate of about 1.3 grams per minute. It contained about 69% of dimethylnitrosoamine, 18% of dimethylamine and 13% of water by weight. A portion of the product amounting to 269.5 grams was distilled through a column packed with glass helices and having approximately 10 theoretical plates under a pressure of 100 mm. of mercury and with a reflux ratio of 5:1. A fraction amounting to about 210 grams was collected at 88–90° C. and identified as dimethylnitrosoamine having a refractive index of 1.4343 at 25° C., a boiling point of 146° C. at 753 mm. pressure. It contained 32.27% carbon and 8.16% hydrogen.

Example III

In a larger system arranged similarly to that described in Example I, 1.33 gram moles per hour of dimethylamine, 1.31 gram moles per hour of nitric oxide and 1.64 gram moles per hour of oxygen (as air) were introduced at room temperature. The crude condensate had the following composition:

| | Percent by weight |
|---|---|
| Dimethylammonium nitrite | 69.0 |
| Dimethylnitrosoamine | 25.0 |
| Dimethylamine | 3.4 |
| Water | 2.5 |
| Total | 99.9 |

After heating to about 120° C. for a period of about 15 minutes and cooling, the liquid showed the following composition:

| | Percent by weight |
|---|---|
| Dimethylnitrosoamine | 83.0 |
| Dimethylamine | 0.6 |
| Water | 16.4 |
| Total | 100.0 |

Pure dimethylnitrosoamine was readily fractionated from this mixture. The efficiency of the process was 91% of theory, the principal loss being due to uncondensed fog.

Example IV

A mixture of oxygen enriched air and ammonia gas were passed over a platinum gauze initially heated electrically to catalyze the oxidation. Air was introduced at the rate of 11.5 liters per minute, oxygen at the rate of 440 ml. per minute and ammonia at 2350 ml. per minute. The oxidation mixture was passed through a water scrubber to cool the gas and remove excessive amounts of water. The effluent gas was immediately mixed with a stream of dimethylamine gas introduced at the rate of 2350 ml. per minute. These quantities produced 0.0927 gram mole per minute of dimethylnitrosoamine. The reaction mixture passed downwardly through a jacketed column packed with quarter inch glass helices into a liquid separator at the bottom of a large column packed with quarter inch Berl saddles through which the gases passed upwardly. The latter column acted as a fog breaker and the liquid product containing dimethylnitrosoamine and dimethylammonium nitrite, drained from the bottom of the column. The effluent liquid was subsequently heat treated at 120° C. for 20 minutes to convert the crude product to dimethylnitrosoamine.

Example V

A mixture of oxygen enriched air and ammonia gas comprising a flow of about 17,250 milliliters per minute of air, 660 milliliters per minute of oxygen and 3525 milliliters per minute of ammonia is preheated to 300° C. and passed at atmospheric pressure through a conventional ammonia oxidation unit comprising platinum gauze heated to a temperature of about 900 to 1000° C. The effluent gas is passed through a water scrubber to cool the gas and to remove excessive amounts of water.

This stream of gas is introduced into the top of a packed tower together with a stream of mixed amine gas comprising about 80% of dimethylamine, 19% of trimethylamine and about 1% of other gases. Such a gas advantageously can be obtained by dehydration of the effluent from the catalytic ammoniation of methanol. The flow of mixed amine gases amounts to about 4430 milliliters per minute. Most of the product liquefies in the tower and drains into a surge tank. The latter is fitted with a second fog-breaking tower packed with Berl saddles and surmounted by a cylone separator to remove the final traces of liquid from the gas. Liquids from the fog-breaking tower and the cyclone are both returned to the surge tank. The effluent gas from the cyclone comprising largely trimethylamine amounts to about 550 milliliters per minute. This stream is admixed with half its volume of anhydrous ammonia and the mixture is compressed to 60 atmospheres and passed over an alumina catalyst at 410° C. to convert the trimethylamine largely to dimethylamine. The converted gas, largely dimethylamine, is split and a portion is re-introduced into the top of the reaction tower with fresh dimethylamine. Most of the regenerated dimethylamine is introduced with liquid product from the surge tank and passed through a heating coil maintained by means of a liquid bath at 120° C. The effluent is flashed to a fractionating tower removing trimethylamine overhead at a temperature of about 5° C. Water is removed as a side stream through a stripper and the bottom product is substantially pure dimethylnitrosoamine produced at a rate of about 10 grams per minute.

Various modifications can be made in the teachings of the specific examples to provide other embodiments which fall within the scope of this invention. Thus, in place of the dimethylamine there can be substituted other dialkylamines, preferably those having not more than five carbon atoms in each alkyl radical, such as methylethylamine, diethylamine, diisopropylamine, methylpropylamine, dibutylamine, diamylamine and the like. Moreover, considerable variation can be made in the relative proportions of nitric oxide, oxygen and dialkylamine introduced into the reaction system. The reaction temperature used can also vary widely, although the nitric oxide, oxygen and dialkylamine are generally introduced into the reactor at temperatures within the range of from about 0° to about 100° C.

I claim:
1. A method for the manufacture of a lower dialkylnitrosoamine which comprises reacting a lower dialkylamine, in which each alkyl group contains not more than 5 carbon atoms, nitric oxide and oxygen in the presence of an excess of dialkylamine to provide alkaline conditions to produce a liquid mixture of the lower dialkylnitrosoamine and the corresponding dialkylammonium nitrite, said nitric oxide and oxygen being reacted in a molar ratio of about 4:1 to produce nitrous anhydride.

2. A method according to claim 1 in which the dialkylamine is dimethylamine and the liquid mixture contains dimethylnitrosoamine and dimethylammonium nitrite.

3. A method according to claim 1 in which the dialkylamine, nitric oxide and oxygen are reacted at a temperature within the range from about 0° to about 100° C.

4. A method according to claim 3 in which the dialkylamine, nitric oxide and oxygen are reacted in substantially the molar proportions of more than about 4:4:1, respectively.

5. A method according to claim 1 in which the dialkylamine, nitric oxide and oxygen are reacted in vapor phase.

6. A method according to claim 1 in which he dialkylamine, nitric oxide and oxygen are reacted in liquid phase.

7. A method according to claim 1 in which said liquid mixture is heated at about 120° to about 140° C. for a period of time sufficient to convert the nitrite present therein to the corresponding nitrosoamine.

8. A method for the manufacture of a lower dialkylnitrosoamine which compries reacting a mixture comprising a lower dialkylamine and a lower trialkylamine, each alkyl group of said dialkylamine and trialkylamine containing not more than 5 carbon atoms, with nitric oxide and oxygen in the presence of an excess of dialkylamine to provide alkaline conditions to produce a liquid mixture of the lower dialkylnitrosoamine and the corresponding dialkylammonium nitrite and trialkylammonium nitrite, and heating the liquid mixture at a temperature within the range of about 120° to about 140° C. while introducing a mixture comprising a lower dialkylamine and a lower trialkylamine into the liquid and for a period of time sufficient to convert the nitrites therein to a lower dialkylnitrosoamine, said nitric oxide and oxygen being reacted in a molar ratio of about 4:1 to produce nitrous anhydride.

9. A method according to claim 8 in which the dialkylamine is dimethylamine and the trialkylamine is trimethylamine.

10. A method according to claim 8 in which the mixture comprising dialkylamine and trialkylamine and the nitric oxide and oxygen are reacted at a temperature within the range from about 0° to about 100° C.

11. A method according to claim 10 in which the dialkylamine, nitric oxide and oxygen are reacted in substantially the molar proportions of more than about 4:4:1, respectively.

12. A method according to claim 8 in which the mixture comprising dialkylamine and trialkylamine and the nitric oxide and oxygen are reacted in vapor phase.

13. A method according to claim 8 in which the mixture comprising dialkylamine and trialkylamine and the nitric oxide and oxygen are reacted in liquid phase.

14. A method for the manufacture of dimethylnitrosoamine which comprises reacting dimethylamine with nitric oxide and oxygen in the presence of an excess of dimethylamine to provide alkaline conditions and at a temperature of about 0° to 100° C. to produce a liquid mixture of dimethylnitrosoamine and dimethylammonium nitrite, said nitric oxide and oxygen being reacted in a molar ratio of about 4:1 to produce nitrous anhydride.

15. A method according to claim 14 in which said liquid mixture is heated at about 120° to about 140° C. for a period of time sufficient to convert the dimethylammonium nitrite present therein to dimethylnitrosoamine.

16. A method for the manufacture of dimethylnitrosoamine which comprises reacting a mixture comprising dimethylamine and trimethylamine with nitric oxide and oxygen in the presence of an excess of dimethylamine to provide alkaline conditions and at a temperature of about 0° to about 100° C. to produce a liquid mixture of dimethylnitrosoamine, dimethylammonium nitrite and trimethylammonium nitrite, and heating the liquid mixture at a temperature within the range of about 120° C. to about 140° C. while introducing a mixture comprising dimethylamine and trimethylamine into the liquid and for a period of time sufficient to convert the nitrites therein to dimethylnitrosoamine, said nitric oxide and oxygen being reacted in a molar ratio of about 4:1 to produce nitrous anhydride.

17. The process for the preparation of a di-(lower alkyl)-N-nitrosamine which comprises reacting a di-(lower alkyl)amine with nitric oxide and air in the presence of an excess of the di-(lower alkyl)amine to produce a liquid mixture containing the di-(lower alkyl)-N-nitrosamine,, said nitric oxide and air being reacted in the molar ratio of about 4:5 in proportion approximate to that required to produce nitrous anhydride.

References Cited in the file of this patent

UNITED STATES PATENTS

| | | |
|---|---|---|
| 2,402,315 | Crowder | June 18, 1946 |
| 2,597,027 | Passino et al. | May 20, 1952 |
| 2,621,205 | Doumani et al. | Dec. 9, 1952 |
| 2,627,526 | Du Brow et al. | Feb. 3, 1953 |

OTHER REFERENCES

Mellor: "Modern Inorganic Chem.," revised ed., by S. O. Parkes, Longmans, Green and Co. (1951), pp. 429, 434 and 435.

Schmid: Monatschefte fur Chemie, 85:424–40 (1954).

Houben: "Die Methoden der Organischen Chemie," Dritte Auflage Vierten Band Georg Thieme, Verlag, Leipzig,, publishers, Photo-Lithoprint. Reproduction by Edwards Bros., Inc., publishers, Ann Arbor, Mich., 1944, pp. 91, 90, 95–96. (Copy in Division 6.)

Riebsomer: "The Reactions of Nitrogen Tetroxide with Organic Compounds," 36, Chem. Revs., pp. 157–203; in particular, pp. 160, 168–169.

Fuson et al.: "Org. Chem." (1942), pages 118–119. Available in Div. 6, U.S. Patent Office, Washington, D.C.

Kobe: "Inorg. Process Industries" (1948), page 277. Available in Div. 6, U.S. Patent Office, Washington, D.C.

Foster: "Inorg. Chem. For Colleges" (1936), page 481. Available in Div. 6, U.S. Patent Office, Washington, D.C.